United States Patent
Schaffer et al.

(10) Patent No.: US 6,281,631 B1
(45) Date of Patent: Aug. 28, 2001

(54) VEHICLE LIGHT SYSTEM CIRCUIT WHICH AUTOMATICALLY COMPENSATES FOR A LIGHT SOURCE FAILURE

(75) Inventors: Thomas Scott Schaffer, Clinton Township; James Anthony Poirier, Sterling Heights, both of MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/458,866

(22) Filed: Dec. 10, 1999

Related U.S. Application Data
(60) Provisional application No. 60/112,178, filed on Dec. 14, 1998.

(51) Int. Cl.[7] ............................................. B60Q 1/02
(52) U.S. Cl. ........................ 315/82; 315/88; 315/307; 307/10.8; 340/475.2
(58) Field of Search ........................... 315/82, 83, 77, 315/88, 131, 291, 307; 307/10.8; 340/475.2, 458, 642, 643

(56) References Cited

U.S. PATENT DOCUMENTS

| | | | |
|---|---|---|---|
| 3,814,984 | 6/1974 | Morita et al. | 315/83 |
| 4,667,129 * | 5/1987 | Papillon | 315/82 |
| 4,683,403 * | 7/1987 | Iwamoto et al. | 315/83 |
| 5,164,655 * | 11/1992 | Heavey | 322/8 |
| 5,198,727 * | 3/1993 | Allen et al. | 315/291 |
| 5,281,947 * | 1/1994 | Durley et al. | 340/433 |
| 5,381,074 * | 1/1995 | Rudzewicz et al. | 315/77 |
| 5,646,485 * | 7/1997 | Simon et al. | 315/82 |
| 5,661,368 * | 8/1997 | Deol et al. | 315/82 |
| 5,680,098 * | 10/1997 | Bejster et al. | 340/458 |
| 5,955,945 * | 9/1999 | Fuhrer | 340/479 |
| 6,118,371 * | 9/2000 | Haddad et al. | 340/458 |

FOREIGN PATENT DOCUMENTS

| | | |
|---|---|---|
| 0586734 | 3/1994 | (EP) . |
| 2139369 | 1/1973 | (FR) . |

OTHER PUBLICATIONS

Siemens PROFET Preliminary Data Sheet BTS550P, Aug. 31, 1998 PCT International Search Report.

* cited by examiner

Primary Examiner—Haissa Philogene

(57) ABSTRACT

A vehicle light system circuit includes a PROFET to automatically detect the presence of a faulty light source and switch to an unaffected light source. The system also adjusts the brightness of the unaffected light source by adjusting a PWM signal applied thereto to approximate the brightness of the unaffected light source.

18 Claims, 1 Drawing Sheet

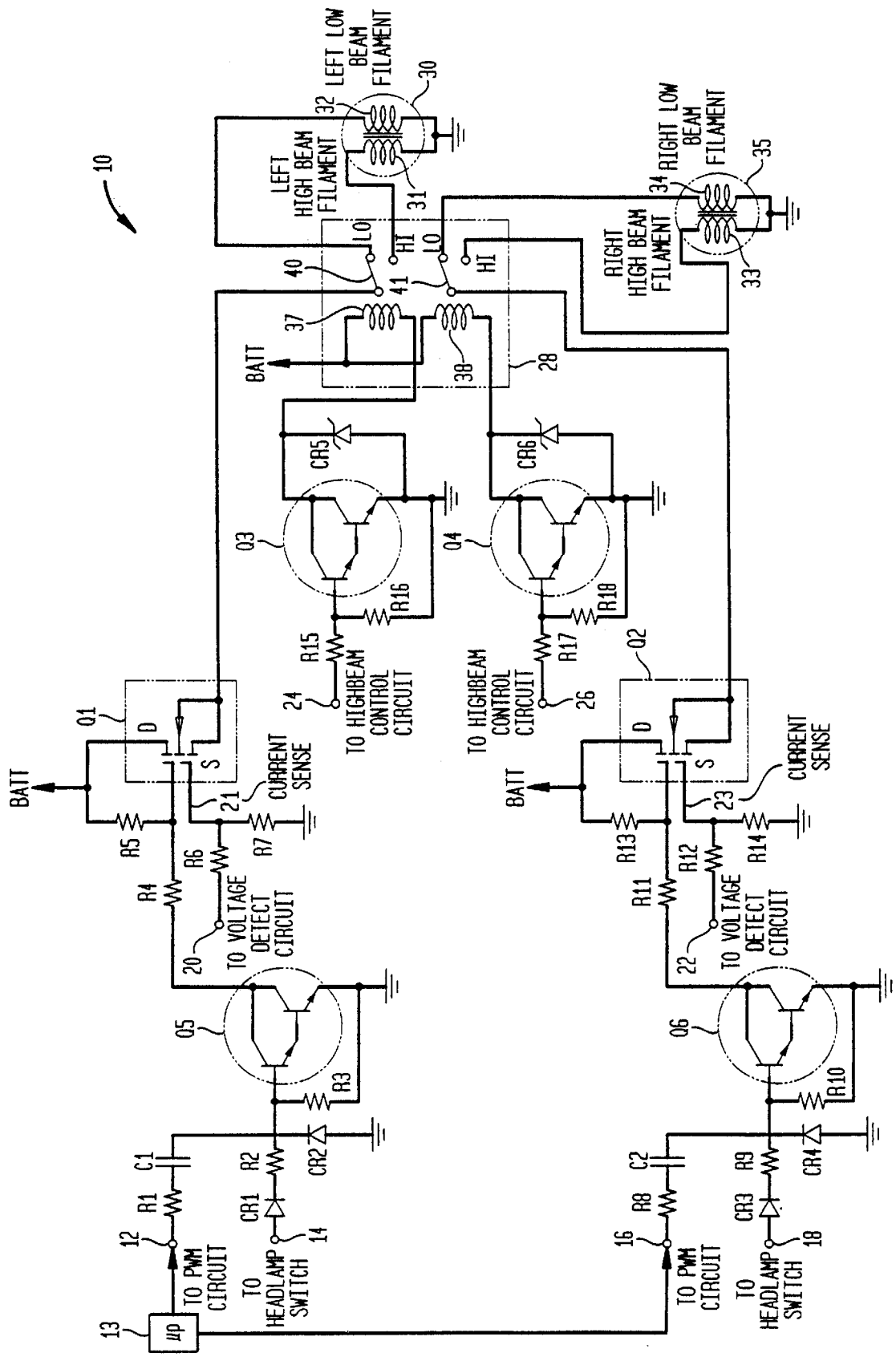

VEHICLE LIGHT SYSTEM CIRCUIT WHICH AUTOMATICALLY COMPENSATES FOR A LIGHT SOURCE FAILURE

This application claims benefit of Provisional Application No. 60/112,178 filed Dec. 14, 1998.

BACKGROUND OF THE INVENTION

1. Field of the Invention

The present invention relates to a vehicle headlight system, and in particular to an automobile headlight system that controls a pulsed power source to energize a set of lighting elements.

2. Related Art

Motor vehicle headlight systems generally allow a set of headlamps to be illuminated in a low beam mode or a high beam mode. Usually, each headlamp includes a low beam filament and a high beam filament, wherein the low beam filaments are energized in the low beam mode and the high beam filaments are energized in the high beam mode. Such a system usually includes two relays and four fuses. One relay is used to energize both low beam filaments at full intensity and the other relay is used to energize both high beam filaments at full intensity. Each fuse is associated with, and provides overload protection, for a particular filament.

The system described above has a number of disadvantages. First, such a system does not allow pulsed power to be applied across the headlamp filaments because pulsed voltage cannot be continuously applied across a relay. Instead, the filaments are continuously energized at a particular voltage level; usually battery voltage minus small voltage drops from the system. Continuously energizing the filaments at high intensity causes high power consumption and shortens the life of the filaments. Also, fuses are mechanical devices that must be manually replaced in the event of a short to ground. When a fuse blows, the vehicle is usually taken to a dealer to replace the fuse for a cost or under warranty. As mechanical devices, fuses can be less reliable than semiconductor devices. Additionally, fuses do not allow the system to sense whether there is an open or short circuit condition in the headlight system and to automatically switch power to an operable filament when a fault condition is present with a particular filament.

Therefore, it is desirable to provide a vehicle headlight system that allows pulsed power to be applied across selected headlight filaments. It is also desirable to provide a vehicle headlight system which includes solid state switching devices to connect the filaments to the power source, and a control element to detect the presence of a fault condition and automatically adjust the headlight system to overcome detected fault conditions.

SUMMARY OF THE INVENTION

The present invention is a headlight system that provides pulsed power to the headlamp filaments through a set of solid state switching devices controlled by a control element. The present headlight system is capable of supplying pulsed power to maintain a constant RMS value across the selected headlamp filaments.

Using solid state switching devices reduces the need to have a fuse for each filament and thus the requirement of fuse serviceability. The present headlight system also recognizes when a fault condition exists for a particular filament and automatically switches to an operable filament. The present vehicle headlight system is also configured to adjust a characteristic of the pulsed power, for example, by adjusting the duty cycle of a PWM drive signal, in order to adjust the brightness of the filaments in either headlamp. For example, it may be desirable to compensate for the loss of low beam filament in one headlamp by energizing the high beam filament and adjusting the pulsed power across the high beam filament so that the brightness of that high beam filament approximates the brightness of the low beam filaments of the unaffected headlamp.

In one embodiment, the present vehicle headlight system comprises: a first lamp comprising first and second filaments; a second lamp comprising third and fourth filaments; a power supply; first and second switches, each of the switches having an input coupled to the power supply and an output coupled to a respective one of the first and second lamps, each switch output providing one of a constant output and a pulsed output in response to a control signal; first and second sensors respectively operatively coupled to one of the first and second switches, the first and second sensors providing a fault indication when a respective one of the first, second, third and fourth filaments are inoperable; a control unit coupled to the first and second switches and adapted to provide the control signal, the control signal automatically causing one of the first and second switches to provide a first pulsed output so that the brightness of the second and fourth filaments is approximately equal to the brightness of the first and third filaments when the fault indication is present.

In another embodiment of the present invention, each of the headlamps include one filament and a control unit that controls a characteristic of the pulsed power across a particular filament to provide both low and high beam brightness levels from the filament. Here, only one filament is required to provide both levels of brightness. For example, the headlight system may be configured to provide PWM signal to the headlight filaments and the control unit may adjust the brightness of the filaments by adjusting the duty cycle of the PWM signal. In another embodiment, a range of duty cycles may be provided in order to provide a range of headlamp brightness levels rather than only low beam and high beam levels.

Further details and advantages of the invention will be apparent from the accompanying drawing and following description.

BRIEF DESCRIPTION OF THE DRAWING

FIG. 1 shows a circuit diagram of an exemplary embodiment of the present invention.

DETAILED DESCRIPTION

Circuit 10 is a portion of the headlight system in accordance with the present invention The upper and lower portions of circuit 10 are mirror images of each other illustrating the portions associated with the left and right portions of the headlight system. Each portion includes a headlamp having a high beam filament and a low beam filament contained therein, and switch elements and relay elements for energizing the filaments. The upper portion of circuit 10, which relates to the left headlamp, is now described. This description is equally applicable to the lower portion of circuit 10.

Micro controller 13 is connected to input connection 12 and controls the generation of a pulse width modulated (PWM) drive signal. Micro controller 13 may be programmed to provide various control functions as is known in the art. The use and programming of a control unit such as micro controller 13 to control the various elements described below, as well as suitable types of micro controllers, is well known in the art and will not be discussed in detail here. A suitable micro controller includes, but is not limited to, Motorola MC688CO8. Manual control of the present headlight system by operation of a headlamp switch (not shown) is provided for via input connection 14.

The control signal from input connection 12 is coupled to the base of Darlington transistor Q5 resistor R1 and capacitor C1. C1 determine the frequency and duty cycle of the PWM signal input to transistor Q5. The combination of resistor R1 and capacitor C1 also provide isolation of micro controller 13 from the downstream elements of circuit 10 in the event micro controller 13 fails. Resistor R1 and Capacitor C1 AC couple the signal from input connection 12 to Darlington transistor Q5. This AC coupling allows low beam operation of the headlight using the manual control signal from input connection 14 in the event of micro controller 13 failure. Diode CR1 is an isolation diode that provides isolation for elements coupled to input connection 14. Diode CR2 provides negative transient spike protection for transistor Q5 maintaining the base emitter voltage C1 clamped at about at least −0.7 volts. Diode CR2 ensures proper discharge of capacitor C1 to generate the PWM signal.

The base of transistor Q5 is coupled to pull down resistor R3 which pulls the base voltage of transistor Q5 to ground avoiding a floating base voltage when no input signals are present at nodes 12 and 14. This ensures that transistor Q5 remains OFF when the filaments in headlamp 30 are de-energized. The collector of transistor Q5 is connected to the gate input of PROFET Q1 via current limiting resistor R4. PROFET is a registered trademark of Infineon Technologies AG. The battery, or another suitable power source, is connected to the gate input of PROFET Q1 via resistor R5 to set the quiescent point of PROFET Q1. The drain of PROFET Q1 is coupled to the battery and the source of PROFET Q1 is coupled to steering relay 28. It can be seen that the application of a PWM signal to the gate input of PRO FET Q1 controls PROFET Q1 to provide pulsed power to selected filaments 31 or 32 via PROFET Q1 and steering relay 28.

PROFET Q1 further includes current sensing line 21 that provides an output that is proportional to the current provided to steering relay 28. The output of current sense line 21 is a signal which is proportional to the output of PROFET Q1, but reduced by a factor of about 12 to 15 thousand. Since the output from current sensing line 21 is proportional to the current applied to the filaments, zero current from current sense line 21 indicates an open circuit condition and a relatively high current from current sense line 21 indicates a short circuit condition. The output of current sense line 21 is provided to a voltage detect circuit (not shown) via output connection 20 through current limiting resistor R6. The output of the voltage detect circuit may be provided to micro controller 13 in a manner known in the art. Alternatively, the voltage detect circuit may be incorporated into micro controller 13.

Steering relay 28 is a dual relay package comprising relay 37 associated with left side headlamp 30 and relay 38 associated with right side headlamp 35. Steering relay 28 includes switches 40 and 41 associated with respective relays 37 and 38. For example, when relay 37 is de-energized, switch 40 connects the output of PROFET Q1 to low beam filament 32, and when relay 37 is energized, switch 40 connects the output of PROFET Q1 to high beam filament 31. Relay 37 is energized and de-energized by a high beam control circuit (not shown) connected to input connection 24. The high beam control circuit may also be incorporated into micro controller 13, wherein micro controller is programmed to turn ON Darlington transistor Q3 when high beam filament 31 must be energized. Relay 37 is energized and de-energized by Darlington transistor Q3 that is connected to input connection 24 via current limiting resistor R15. Darlington Transistor Q3 is also coupled to Zener diode CR5 which protects transistor Q3 against transient conditions and to pull down resistor R16 which ensures that transistor Q3 remains in the OFF state when headlamp 30 highbeam is deenergized.

The operation of the circuit 10 is now described. During normal operation, steering relay 28 connects the outputs of PROFETs Q1 and Q2 to one of the desired filament pairs 32 and 34 or 31 and 33. PROFETs Q1 and Q2 are driven by respective transistors Q5 and Q6 based on control signals from input connections 12, 14, 16 and 18. Based on the control signals, PROFETs Q1 and Q2 may provide either constant DC or pulsed power to the selected filament pair.

When a fault condition exists, the present headlight system automatically detects the presence of the fault and switches filaments in order to de-energize the faulty filament and to energize the unaffected filament. The present headlight system also adjusts the brightness of the unaffected filament by adjusting the PWM signal applied thereto in order to approximate the brightness of the filament in the unaffected headlamp. The presence of a faulty condition is detected by monitoring the output of current sensing lines 21 and 23. Zero current from current sensing lines 21 and 23 indicate the presence of an open circuit condition and high current from current sensing lines 21 and 23 indicated the presence of a short circuit condition.

The brightness of the energized filament is controlled by adjusting the duty cycle of the PWM drive signal applied to the filaments. For example, duty cycle of the PWM signal via input connections 12 and 16. For example, in the event that low beam filaments 32 and 34 are energized and a short circuit condition appears for low beam filament 32, micro controller 13 detects the short circuit condition by detecting the high current output form current sensing line 21. In response, relay 37 is energized so that switch 40 connects the output of PROFET Q1 to high beam filament 31 and the duty cycle of PWM signal form PROFET Q1 is reduced to reduce the brightness of filament 31 to thereby approximate the brightness of low beam filament 34. In this manner, the present headlight system automatically detects a fault condition and compensates for the loss of a low beam filament by energizing the high beam filament at a lower brightness level. It can be seen that the present invention provides a driver with two low-beam headlights even if a low beam filament is unavailable from one headlamp. Previously, the loss of a low-beam filament would force the driver to use a single headlamp or the high beam.

In an alternative embodiment, although not shown, it can be appreciated that the present invention may be modified so that a fault condition in a high beam filament may be compensated for by energizing the low beam filament and adjusting the brightness of the low beam filament to approximate the high beam filament in the other headlamp. It can also be appreciated that a fault indication may be provided to the driver, for example by a flashing light on the dashboard, if the outputs from current sensing lines 21 and 23 indicate a fault condition. The detection and indication of a fault condition by the present headlight system allows the driver to immediately recognize that a fault condition exists where otherwise the drive may not become aware of the fault condition until much later.

Further, the present invention may use the automatic turn OFF feature of PROFETs Q1 and Q2 to determine whether a short or an open circuit condition resulted in the shutoff of a particular PROFET. As is known in the art, a PROFET device automatically turn OFF in the event of high output current through it. As such, when a PROFET fails to provide any output current, it may be difficult to initially determine whether the PROFET turn OFF was due to a short circuit or an open circuit condition. Therefore, micro controller 13 may be programmed to periodically turn ON the effected PROFET and check the output of the associated current sense line. If no output is present at the current sense line, it can be assumed that an open condition exists whereas if a rapid increase in the output of the current sense line followed by zero current through the PROFET is detected immediately after the PROFET is turned ON. In either event, micro controller 13 may be programmed to automatically provide an indication to the driver and switch the power to an operable filament, that is, a filament not associated with the fault condition, via steering relay 28.

One of ordinary skill can further appreciate that the circuitry of the present invention can be readily adapted to provide daytime running (DTR) lamps. DTR lamps involve the headlights being illuminated even when the user has not actuated the manual headlamp switch. During day times, the DTR lamps are believed to improve the visibility of the vehicle to other drivers. In a similar fashion, the invention is also readily suitable for automatic headlamps, in which a light sensor is used to determine when it is sufficiently dark to warrant the illumination of the headlamps. In both these situations, one of ordinary skill can appreciate that the present invention provides the flexibility of illuminating any of the filaments to a variety of illumination levels through the use of PWM.

In a similar vein, another alternative embodiment of the present invention includes a flash-to-pass feature, wherein the operator can signal to the vehicle ahead of him/her using headlamps 30 and 35. In some flash-to-pass features, a flash-to-pass input to a headlight system may cause all four filaments in both headlamps to be energized momentarily. The present headlight system implements a flash-to-pass feature by momentarily causing the low and high beam filaments to be alternately energized. Such a feature may be implemented by programming micro controller 13 as required to control relays 37 and 38 of steering relay 28 thereby causing the headlamps to flash. This flash-to-pass strategy is effective regardless of whether the headlamps are energized in the low beam or high beam mode. These filaments may further be illuminated at any of the various illumination intensities described earlier.

In another alternative embodiment, the present invention may be modified by providing a PROFET for each filament. Such a configuration would obviate the need for steering relay 28 because each filament is driven by a respective PROFET, which is controlled by micro controller 13. In such a case, any combination of the filaments may be energized, wherein each filament is energized by a respective DC or PWM signal. The presence of a fault condition in a particular filament is detected as described above by monitoring the output of the current sensing lines. Further, micro controller 13 may be programmed to adjust the combination of filaments and their respective drive signals to provide an approximately balanced output from the headlamps as described above.

In another alternative embodiment, the present invention may be modified by providing a single filament in each headlamp. The brightness level of each filament is controlled by micro controller 13 by adjusting the duty cycle of the PWM drive signal as described above. As can be appreciated, the symbol of a dual gated MOSFET shown in the figure is a simplified equivalent circuit representing a far more complex circuit. The overall operation represented by the simplified symbols of the figure represent that the PROFET connects its output to the power supply BATT when the command voltage at the node between the resistors R4 and R5 is at an enabling level, and the current sensing line 21 is at a value indicating that the current flowing in the supply leads to the lamps is within the predetermined range, that is, greater than the zero and less than a level which would indicate a shout circuit.

One of ordinary skill also appreciates that, while it may be desirable for performance reasons to include a driver circuit for each low-high beam filament combination, it may be desirable for cost reasons to have a single driver. In such situations, a detected low beam filament failure would result in both high beam filaments being operated in a reduced intensity mode through PWM.

Although exemplary embodiments of the present invention have been shown and described herein, it will be understood that various changes, alterations and modifications may be made to the system without departing from the spirit and scope of the appended claims.

What is claimed is:

1. A vehicle light system, comprising:
a controller connected to a base of a transistor to control a pulse width modulated drive signal;
a resistor and a capacitor connected between said controller and said base of said transistor, said resistor and capacitor determining a frequency and a duty cycle of said pulse width modulated drive signal supplied to said base of said transistor;
a collector of said transistor connected to a gate input of a PROFET;
a drain of said PROFET connected to a power source;
a source of said PROFET connected to a relay; and
said relay connected between a first and a second light source to selectively power one of said first and second light source upon a failure of one of said second and first light source at a predetermined brightness level.

2. A system according to claim 1, wherein said predetermined brightness level is substantially equivalent to a brightness level of one of said first and second failed light source.

3. A system according to claim 1, further comprising a current sensing line connected to said PROFET, said current sensing line for providing an output proportional to a current to said relay.

4. A system according to claim 3, wherein said PROFET provides either a constant DC or a pulsed power to said relay in response to said current sensing line.

5. A system according to claim 3, further comprising a voltage detect circuit connected to said current sensing line.

6. A system according to claim 1, further comprising a pull down resistor connected to said base of said transistor.

7. A system according to claim 1, further comprising a control circuit connected to said relay to energize and deenergize size relay.

8. A system according to claim 7, wherein said controller includes said control circuit.

9. A system according to claim 1, wherein said controller intermittently activates said PROFET to identify and output from a current sensing line connected to said PROFET.

10. A method of operating a first, second, third and fourth lighting filament, including the steps of:

(a) assigning first and third filaments to a first function (HI);

(b) assigning second and fourth filaments to a second function (LO);

(c) selecting one of said first and second functions for operation;

(d) supplying a required amount of power to the filaments assigned to said selected function;

(e) detecting whether a current flowing to each of the supplied filaments is within a predetermined range such that in response to the detection of a current outside of the predetermined range in a inoperative filament, ceasing the supply of current to said inoperative filament, and applying a second required amount of power to one of the filaments assigned to the unselected function as a replacement filament, said second required amount of power being selected to ensure that the two filaments respectively receiving first and second required amounts of power illuminate with substantially identical intensity, (f) generating a control signal as a summation of an input from each of a programmable controller, and a manual switch;

(g) supplying the control signal to each of first and second power switches by an isolated AC coupling;

(h) supplying first and second required amounts of power, each from the appropriate one of outputs of first and second power switches; and (i) applying said first required amount of power to an operative filament assigned to the selected function; and (j) applying said second required amount of power to the replacement filament.

11. A method according to claim 10 further comprising the steps of:

(a) generating a current indicator signal in a current sensor circuit in each of the power switches, each representing the load current flowing through the respective power switch;

(b) supplying each current indicator signal to a command circuit; and (c) basing the detection of a current outside of the predetermined range on the current indicator signal.

12. A method according to claim 10 wherein the signal from the programmable controller includes a PWM signal indicative of a desired intensity of illumination.

13. A method according to claim 10 wherein the signal from the manual switch comprises a voltage representing a user's desire to operate a corresponding lamp.

14. A method according to claim 10 wherein each power switch is a PROFET power switch.

15. A method according to claim 10 wherein each power switch is periodically activated, to enable detection of rapid rise-fall of the current sense output, indicating a short circuit condition, and an absence of rapid rise-fall of the current sense output indicating no short circuit condition.

16. A method according to claim 10, wherein a separate power switch is provided for each filament, and each power switch is controlled by the programmable controller.

17. A method according to claim 10 wherein each power switch is selectively controlled by a DC and a PWM voltage supplied in response to control signals from the programmable controller, and a current sense output is provided from each power switch to the programmable controller.

18. A vehicle light system, comprising:

a controller connected to a base of a transistor to control a pulse width modulated drive signal;

an AC couple between said controller and said transistor;

a collector of said transistor connected to a gate input of a PROFET;

a drain of said PROFET connected to a power source;

a source of said PROFET connected to a relay; and said relay connected between a first and a second light source to selectively power one of said first and second light source upon a failure of one of said second and first light source at a predetermined brightness level.

* * * * *